United States Patent
Wang et al.

(10) Patent No.: US 11,161,428 B2
(45) Date of Patent: Nov. 2, 2021

(54) ADAPTIVE OPEN CIRCUIT VOLTAGE BASED SOC RESET METHOD AT THE END OF CHARGE BASED ON TEMPERATURE AND CHARGING RATE

(71) Applicant: FORD GLOBAL TECHNOLOGIES, LLC, Dearborn, MI (US)

(72) Inventors: Rui Wang, Canton, MI (US); Xiao Guang Yang, Northville, MI (US); Yuan Zhang, Southgate, MI (US); Xu Wang, Northville, MI (US); Xianzhi Gong, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 230 days.

(21) Appl. No.: 16/458,906

(22) Filed: Jul. 1, 2019

(65) Prior Publication Data
US 2021/0001745 A1    Jan. 7, 2021

(51) Int. Cl.
*B60L 58/12*    (2019.01)
*B60L 58/24*    (2019.01)
*B60L 53/62*    (2019.01)
*B60L 53/14*    (2019.01)
*B60K 6/28*    (2007.10)

(52) U.S. Cl.
CPC .............. *B60L 58/12* (2019.02); *B60L 53/62* (2019.02); *B60L 58/24* (2019.02); *B60K 6/28* (2013.01); *B60L 53/14* (2019.02); *B60L 2240/545* (2013.01); *B60L 2240/547* (2013.01); *B60Y 2200/91* (2013.01); *B60Y 2200/92* (2013.01)

(58) Field of Classification Search
CPC .... B60L 58/24; B60L 53/62; B60L 2240/547; B60L 2240/545; B60K 6/28; B60Y 2200/91; B60Y 2200/92
USPC ........................................................ 320/109
See application file for complete search history.

(56) References Cited

U.S. PATENT DOCUMENTS

| | | | | |
|---|---|---|---|---|
| 5,264,764 A | * | 11/1993 | Kuang | B60L 15/2045 318/139 |
| 8,427,109 B2 | | 4/2013 | Melichar | |
| 9,114,723 B2 | * | 8/2015 | Bissontz | B60W 30/18127 |
| 9,190,868 B2 | * | 11/2015 | Gale et al. | H02J 7/0013 |
| 9,337,680 B2 | * | 5/2016 | Gibeau et al. | B60L 58/22 |
| 9,914,368 B1 | * | 3/2018 | Marcicki et al. | B60L 50/64 |
| 9,987,944 B2 | * | 6/2018 | Dunlap etal. | B60L 58/12 |
| 10,449,870 B2 | * | 10/2019 | Chang et al. | B60L 58/24 |
| 10,604,025 B2 | * | 3/2020 | Treharne | B60L 53/14 |

(Continued)

*Primary Examiner* — Sun J Lin
(74) *Attorney, Agent, or Firm* — David B. Kelley; Brooks Kushman P.C.

(57) ABSTRACT

An electrified vehicle includes a traction battery that is operated according to a state of charge of the traction battery. A controller is programmed to operate the traction battery according to the state of charge of the traction battery and, in response to completion of a charge cycle of the traction battery, generates an adaptive relaxation time and an adaptive compensation voltage of the state of charge that changes with a temperature and a charge rate of the traction battery. The controller is further programmed to, in response to expiration of the adaptive relaxation time after completion of the charge cycle, update the state of charge to a value corresponding to a voltage defined by a difference between a measured voltage of the traction battery and the adaptive compensation voltage.

20 Claims, 4 Drawing Sheets

(56) References Cited

U.S. PATENT DOCUMENTS

| | | | |
|---|---|---|---|
| 10,744,885 B2 * | 8/2020 | Jammoul et al. | B60L 53/60 |
| 2010/0280777 A1 | 11/2010 | Jin et al. | |
| 2016/0011269 A1 | 1/2016 | Wang et al. | |

* cited by examiner

ADAPTIVE OPEN CIRCUIT VOLTAGE BASED SOC RESET METHOD AT THE END OF CHARGE BASED ON TEMPERATURE AND CHARGING RATE

TECHNICAL FIELD

This application generally relates to a system and method for determining a state of charge of a traction battery for a vehicle.

BACKGROUND

Electrified vehicles use electrical energy for propulsion and various other features. Electrical energy is stored onboard and used as needed. The electrified vehicle must manage energy usage and monitor the amount of energy available at any time. The state of charge of the energy storage device is estimated during operation including discharge and charge events. Various algorithms are used to estimate state of charge such as Amp-hour integration algorithms. However, such algorithms can lead to errors in the state of charge estimation over time.

SUMMARY

A vehicle includes a traction battery and a controller programmed to operate the traction battery according to a state of charge of the traction battery. The controller is further programmed to, responsive to completion of a charge cycle, generate an adaptive relaxation time and an adaptive compensation voltage that change as a temperature and a charge rate of the traction battery change, and, responsive to expiration of the adaptive relaxation time after completion of the charge cycle, update the state of charge to a value corresponding to a voltage defined by a difference between a measured voltage of the traction battery and the adaptive compensation voltage.

The controller may be further programmed to increase a magnitude of the adaptive compensation voltage responsive to the temperature decreasing for a predetermined adaptive relaxation time. The controller may be further programmed to increase a magnitude of the adaptive compensation voltage responsive to the charge rate increasing for a predetermined adaptive relaxation time. The controller may be further programmed to estimate the state of charge according to a stored state of charge to voltage characteristic that is indexed by the voltage. The controller may be further programmed to detect completion of a charge cycle responsive to battery voltage exceeding a maximum voltage threshold. The controller may be further programmed to detect completion of a charge cycle responsive to battery state of charge estimated during the charge cycle exceeding a user-defined target state of charge. The controller may be further programmed to generate the adaptive relaxation time according to a stored target relaxation time characteristic that is indexed by the temperature and the charge rate. The controller may be further programmed to generate the adaptive compensation voltage according to a stored target compensation voltage characteristic that is indexed by the temperature and the charge rate. The controller may be further programmed to sample the measured voltage upon expiration of the adaptive relaxation time. The controller may be further programmed to initiate another charge cycle responsive to a difference between the state of charge and a target state of charge exceeding a predetermined threshold.

A method includes generating, by a controller, an adaptive relaxation time and an adaptive compensation voltage that vary as a temperature and a charge rate of a traction battery change responsive to completion of a charge cycle. The method further includes updating, by the controller, a state of charge of the traction battery to a state of charge value corresponding to a voltage defined by a difference between a measured voltage of the traction battery and the adaptive compensation voltage responsive to expiration of the adaptive relaxation time after completion of the charge cycle. The method further includes operating, by the controller, the traction battery according to the state of charge.

A magnitude of the adaptive compensation voltage may increase as the charge rate increases for a predetermined adaptive relaxation time. A magnitude of the adaptive compensation voltage may increase as the temperature decreases for a predetermined adaptive relaxation time. The adaptive relaxation time may be set to a predetermined percentage of a predicted full relaxation time. The method may further include sampling, by the controller, the temperature and the charge rate upon completion of the charge cycle. The adaptive compensation voltage may be an expected voltage decay predicted to reach a fully relaxed state of the traction battery.

A vehicle comprising includes a traction battery and a controller programmed to operate the traction battery according to a state of charge of the traction battery. The controller is further programmed to, responsive to completion of a charge cycle, generate an adaptive compensation voltage that is based on a temperature and a charge rate of the traction battery, and, responsive to expiration of a predetermined relaxation time after completion of the charge cycle, update the state of charge to a value corresponding to a voltage defined by a difference between a measured voltage of the traction battery and the adaptive compensation voltage such that the state of charge is updated to a different value than after previous charge cycles when the temperature and charge rate are different than the previous charge cycles.

The controller may be further programmed to increase a magnitude of the adaptive compensation voltage as the temperature decreases. The controller may be further programmed to increase a magnitude of the adaptive compensation voltage as the charge rate increases. The adaptive compensation voltage may be an expected voltage decay predicted to reach a fully relaxed state of the traction battery.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
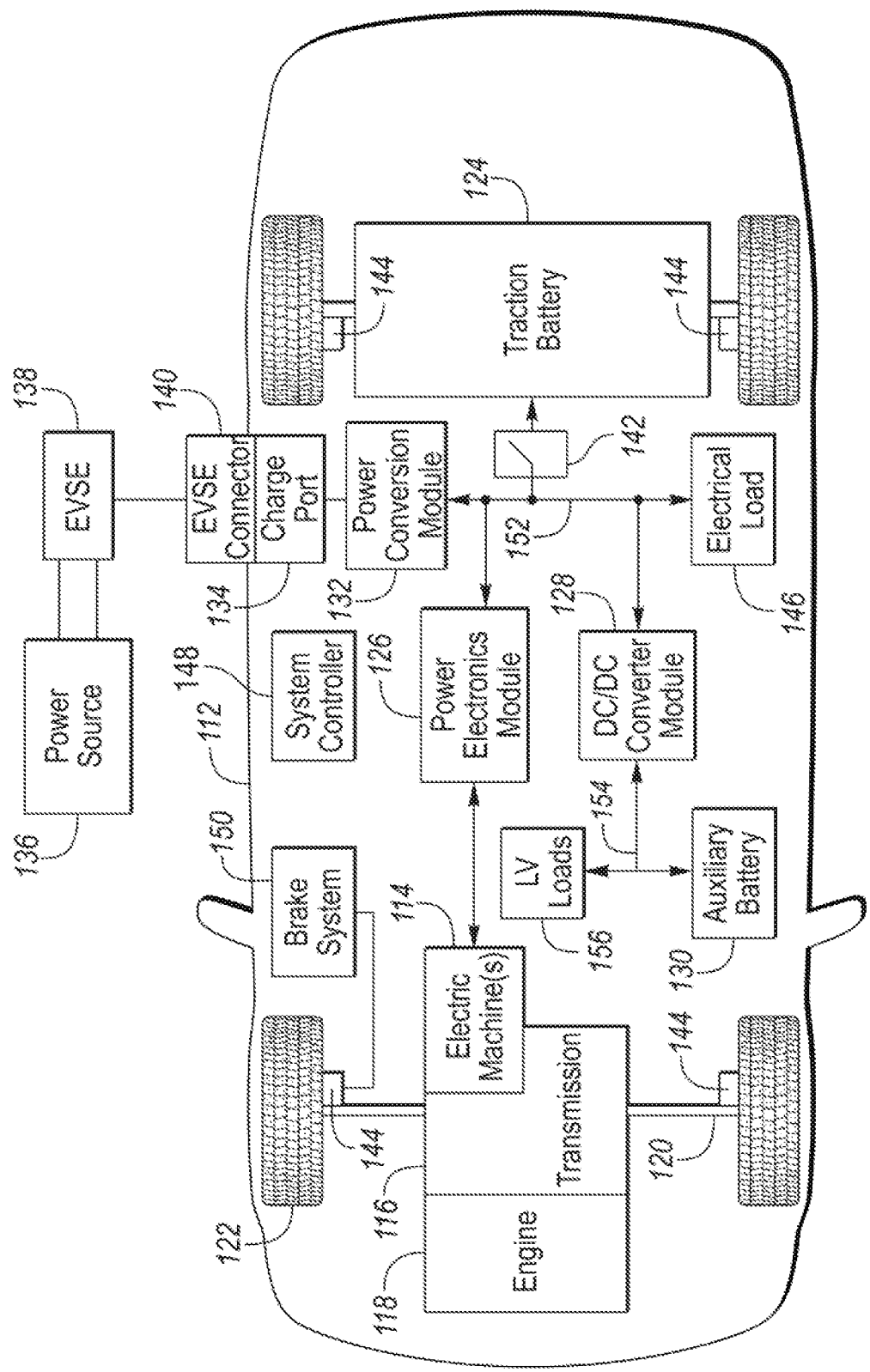
FIG. 1 is a possible configuration for an electrified vehicle illustrating drivetrain and energy storage components.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A battery pack or traction battery 124 stores energy that can be used by the electric machines 114. The traction battery 124 may provide a high voltage direct current (DC) output. A contactor module 142 may include one or more contactors configured to isolate the traction battery 124 from a high-voltage bus 152 when opened and connect the traction battery 124 to the high-voltage bus 152 when closed. The high-voltage bus 152 may include power and return conductors for carrying current over the high-voltage bus 152. The contactor module 142 may be located in the traction battery 124. One or more power electronics modules 126 (also known as an inverter) may be electrically coupled to the high-voltage bus 152. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The vehicle 112 may include a DC/DC converter module 128 that converts the high voltage DC output from the high-voltage bus 152 to a low-voltage DC level of a low-voltage bus 154 that is compatible with low-voltage loads 156. An output of the DC/DC converter module 128 may be electrically coupled to an auxiliary battery 130 (e.g., 12V battery) for charging the auxiliary battery 130. The low-voltage loads 156 may be electrically coupled to the auxiliary battery 130 via the low-voltage bus 154. One or more high-voltage electrical loads 146 may be coupled to the high-voltage bus 152. The high-voltage electrical loads 146 may have an associated controller that operates and controls the high-voltage electrical loads 146 when appropriate. Examples of high-voltage electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger. The charger 132 may condition the power supplied from the EVSE 138 to provide the proper voltage and current levels to the traction battery 124 and the high-voltage bus 152. The charger 132 may be electrically coupled to the contactor module 142. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

Wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1, but it may be implied that the vehicle network may connect to any electronic modules that are present in the vehicle 112. A vehicle system controller (VSC) 148 may be present to coordinate the operation of the various components.

Figure 2:
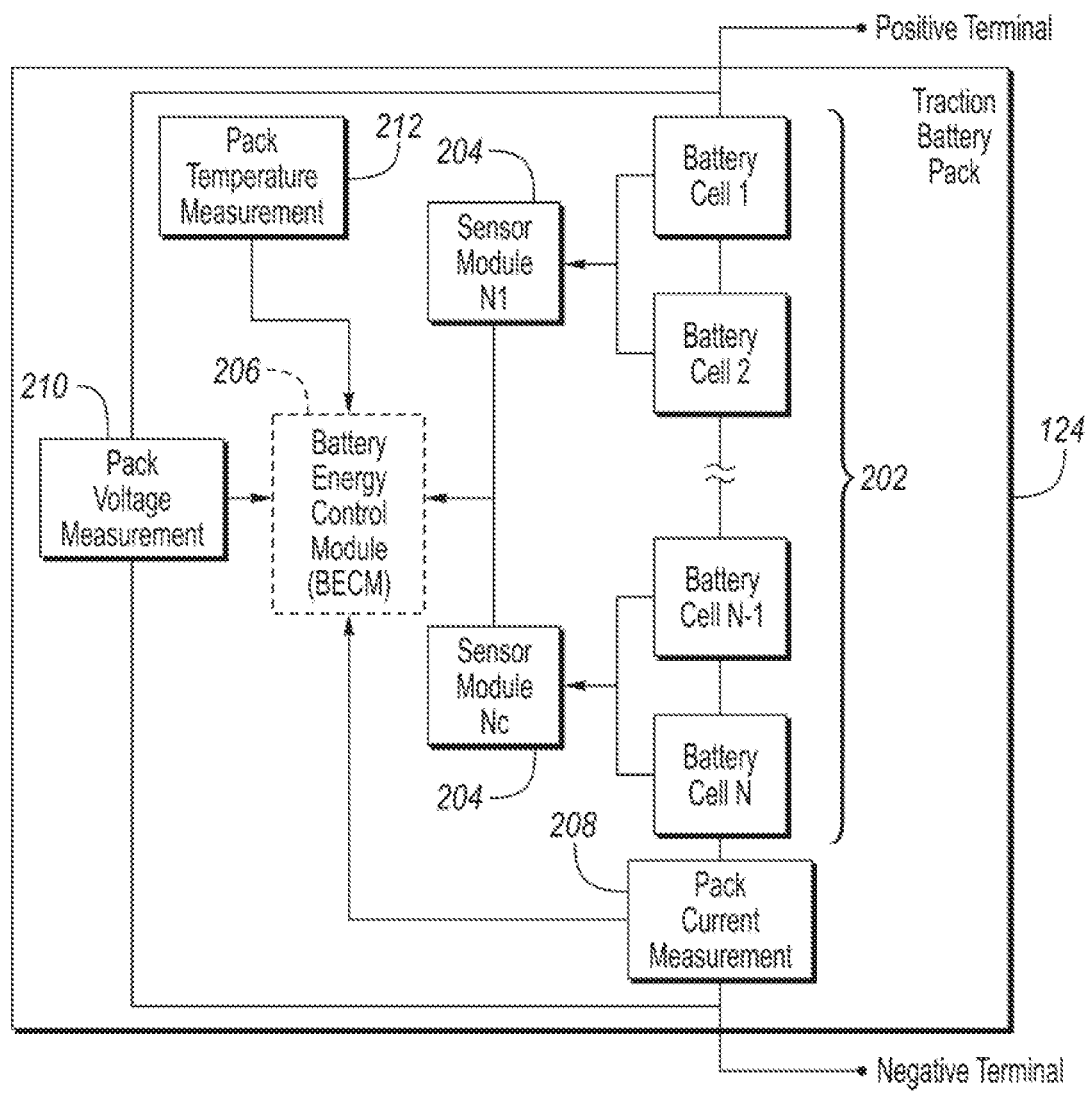
FIG. 2 is a possible configuration for a traction battery.

A traction battery 124 may be constructed from a variety of chemical formulations. Typical battery pack chemistries may be lead acid, nickel-metal hydride (NIMH) or Lithium-on. FIG. 2 shows a typical traction battery pack 124 in a simple series configuration of N battery cells 202. Other battery packs 124, however, may be composed of any number of individual battery cells connected in series or parallel or some combination thereof. A battery management system may have one or more controllers, such as a Battery Energy Control Module (BECM) 206, that monitor and control the performance of the traction battery 124. The battery pack 124 may include sensors to measure various pack level characteristics. The battery pack 124 may include one or more pack current measurement sensors 208, pack voltage measurement sensors 210, and pack temperature measurement sensors 212. The BECM 206 may include circuitry to interface with the pack current sensors 208, the pack voltage sensors 210 and the pack temperature sensors 212. The BECM 206 may have non-volatile memory such that data may be retained when the BECM 206 is in an off condition. Retained data may be available upon the next key cycle.

In addition to the pack level characteristics, there may be battery cell 202 level characteristics that are measured and monitored. For example, the terminal voltage, current, and temperature of each cell 202 may be measured. A system may use one or more sensor modules 204 to measure the battery cell 202 characteristics. Depending on the capabilities, the sensor modules 204 may measure the characteristics of one or multiple of the battery cells 202. The battery pack 124 may utilize up to N, sensor modules 204 to measure the characteristics of all the battery cells 202. Each of the sensor modules 204 may transfer the measurements to the BECM 206 for further processing and coordination. The sensor modules 204 may transfer signals in analog or digital form to the BECM 206. In some configurations, the functionality of the sensor modules 204 may be incorporated internally to the BECM 206. That is, the hardware of the sensor modules 204 may be integrated as part of the circuitry in the BECM 206 and the BECM 206 may handle the processing of raw signals. The BECM 206 may also include circuitry to interface with the contactor module 142 for opening and closing the associated contactors.

It may be useful to calculate various characteristics of the battery pack. Quantities such as battery power capability, battery capacity, and battery state of charge may be useful for controlling the operation of the traction battery 124 as well as any electrical loads receiving power from the traction battery 124. Battery power capability is a measure of the maximum amount of power the traction battery 124 can provide or the maximum amount of power that the traction battery 124 can receive. Knowing the battery power capability allows the electrical loads to be managed such that the power requested is within limits that the traction battery 124 can handle. The above-mentioned characteristics may also be computed for individual or sub-groups of the battery cells 202. The following systems and methods may be applied at a traction battery 124 or battery cell 202 level.

Battery capacity is a measure of a total amount of energy that may be stored in the traction battery 124. The battery capacity may be expressed in units of Amp-hours. Values related to the battery capacity may be referred to as amp-hour values. The battery capacity of the traction battery 124 may decrease over the life of the traction battery 124.

State of charge (SOC) gives an indication of how much charge remains in the traction battery 124. The SOC may be expressed as a percentage of the total charge relative to the battery capacity remaining in the traction battery 124. The SOC value may be output to a display to inform the driver of how much charge remains in the traction battery 124, similar to a fuel gauge. The SOC may also be used by other controllers (e.g., VSC 148) to control the operation of the electrified vehicle. Calculation of SOC can be accomplished by a variety of methods. One possible method of calculating SOC is to perform an integration of the traction battery current over time. This is well-known in the art as ampere-hour integration. Additionally, a relationship between an open-circuit voltage of the battery measured after a rest period and the state of charge may be known. The SOC may be utilized by the BECM 206 to determine when the traction battery 124 has achieved a full charge. A full charge may be detected when the SOC is greater than a predetermined threshold (e.g., 95%). The predetermined threshold may be an SOC value above which a manufacturer discourages operation of the traction battery 124. The predetermined threshold may depend upon the battery chemistry and operation strategy of the traction battery 124. A full charge may also be detected when an open-circuit voltage of the traction battery 124 exceeds a predetermined voltage threshold.

During charging of the traction battery 124, the BECM 206 may communicate with the EVSE 138 to manage the charging process. For example, the BECM 206 may command the EVSE 138 to provide a predetermined voltage, current, or power during various stages of the charging process. At the end of charging, the BECM 206 may request that the EVSE 138 provide zero voltage. The EVSE 138 may respond by ramping down the voltage to zero voltage.

The traction battery 124 and/or battery cell 202 may be characterized by an open-circuit voltage. The open-circuit voltage is the voltage measured at the battery terminals when the battery is not charging or discharging. During operation of the traction battery (e.g., charging and discharging) the voltage measured at the battery terminals (terminal voltage) may not reflect the open-circuit voltage due to impedance with the battery. The terminal voltage may accurately reflect the open-circuit voltage after the battery is relaxed. Relaxation occurs during the time after which charging and discharging terminates. During the relaxation period, the terminal voltage may rise or decay to the open-circuit voltage.

One strategy for computing the state of charge of the traction battery 124 is to measure the open-circuit voltage (OCV) and determined the SOC based on a known SOC-OCV relationship. For example, a relationship between OCV and SOC may be determined for the traction battery 124 during testing and development. The OCV-SOC relationship may be stored in memory as a lookup table. The OCV may be measured when the traction battery 124 is at rest or when no current is flowing. In some cases, the OCV may be measured after a long rest period. For example, the OCV may be measured immediately prior to the next ignition or charge cycle. This helps to ensure a long rest period. Issues may occur when the OCV is measured immediately after the traction battery 124 has been charging or discharging. Due to chemical processes within the battery, the OCV may not settle to a stable value for a period of time after charging and discharging.

Other strategies may be implemented. In some cases, the OCV may be measured a predetermined time after the charge current has ramped down to zero. The predetermined time may be a calibratable time period. For example, the predetermined time may be set to one second. After the predetermined time, the OCV may be measured as the battery terminal voltage. Since the time period may not be sufficient for the traction battery 124 to be fully relaxed, a voltage compensation strategy may be implemented. The voltage compensation strategy incorporates an offset to the measured voltage in order to compensate for the relaxation time. For example, a voltage compensation of 10 milliVolts may be subtracted from the voltage measurement. The predetermined time and the offset may be determined from testing and development of the traction battery. This may be represented by the following:

$$SOC=f(V_{t=is}-10\ mV, T) \tag{1}$$

where $V_{t=is}$ represent a measured battery terminal voltage one second after the charge current has become zero, and T represents the temperature.

The BECM 206 may implement a strategy that allows an operator to charge to a target SOC level. For example, the electrified vehicle may include a user interface (e.g., in-vehicle and/or remote device) that permit the operator to enter a target SOC value. The target SOC value may be less than the full charge level (e.g., 100% SOC) of the traction battery 124. During charging, the charging rate (e.g., charge current) may vary during the charge cycle. The charge rate may depend on the present SOC of the traction battery 124. In addition, the charge rate may decrease as the full charge level is approached.

The charging rate of the traction battery 124 may be stated in terms of a C-rate. The C-rate is a measure of battery charging/discharging rate relative to the maximum capacity of the traction battery 124. For example, the maximum battery capacity may be in terms of Amp-hours. A 1 C charge rate defines a current level that fully charges the battery in one hour. A C rate greater than one defines a current level that charges the battery in less time (e.g., larger current) and a C rate less than one defines a current level that charges the battery in a greater amount of time (e.g., smaller current).

Figure 3:
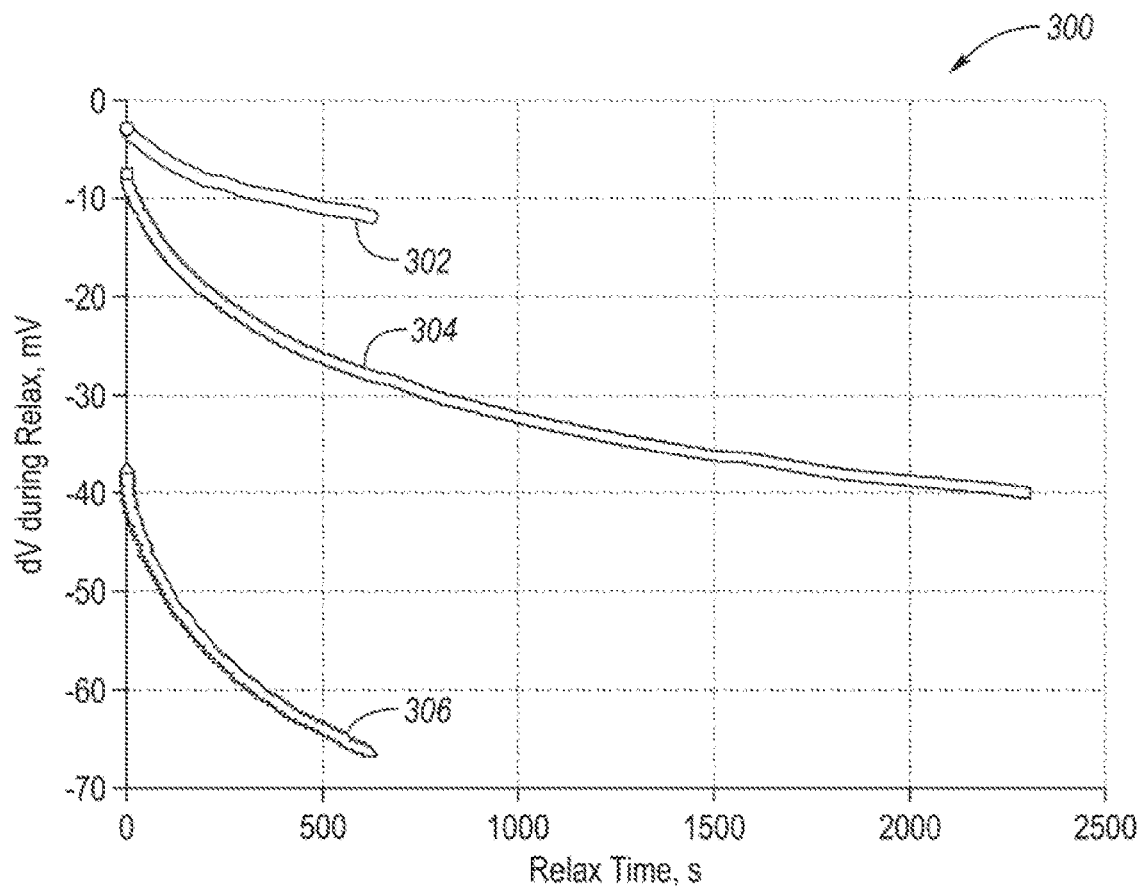
FIG. 3 is a graph depicting a possible change in voltage during a relaxation period for different temperatures.

The above-described strategy performs best when the relaxation time and voltage offset are accurately known. However, the relaxation time can be a long duration and can vary with temperature and charge rate. FIG. 3 depicts a first set 300 of curves that represents the battery relaxation at different temperatures. The first set 300 depicts the change in voltage level during relaxation as a function of time for different temperatures. A first curve 302 represents the change in voltage over time for a temperature of 25 degrees C. A second curve 304 represents the change in voltage over time for a temperature of −10 degrees C. A third curve 306 represents the change in voltage over time for a temperature of −30 degrees C. The curves represent the voltage relaxation over time after a C/20 charge current was applied in the time preceding the time depicted in the plots (e.g., same charging rate at different temperatures). It is observed that the change in voltage over time varies as temperature changes. As observed, the magnitude of the voltage change generally increases as the temperature decreases. The first curve 302 and the third curve 306 represent the voltage change over a period of approximately 10 minutes, while the second curve 304 represents the voltage change over approximately 40 minutes.

Figure 4:
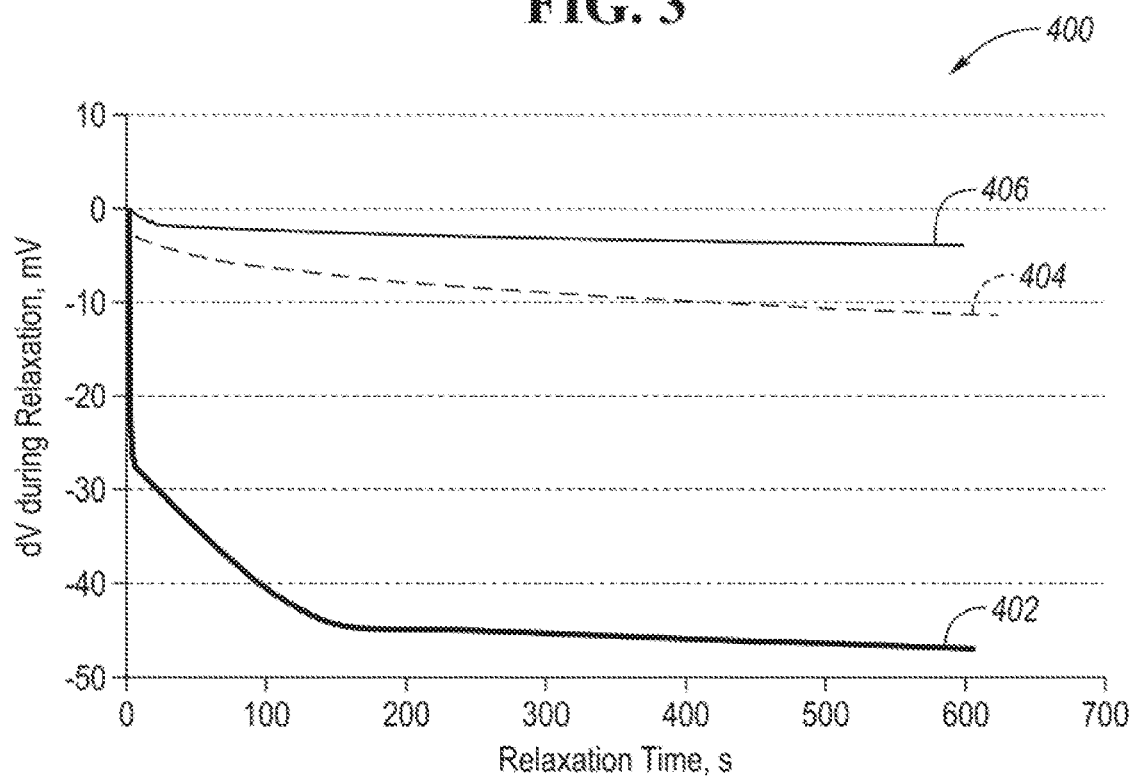
FIG. 4 is a graph depicting a possible change in voltage during a relaxation period for different charging rates.

FIG. 4 depicts a second set 400 of curves that represents the battery relaxation at different charging rates. The second set 400 depicts the change in voltage level during relaxation as a function of time for different charging rates. A first curve 402 represents the change in voltage over time for a 1 C charging rate. A second curve 404 represents the change in voltage over time for a C/20 charging rate. A third curve 406 represents the change in voltage over time for a C/25 charging rate. The curves represent the voltage relaxation over time at a temperature of 25 degrees C. (e.g., same temperature with different charging rates). It is observed that the change in voltage over time varies as charging rate changes.

The change in voltage during the relaxation period varies based on the temperature and the charge rate. As such, it may be difficult to select a relaxation time and offset voltage ahead of time. That is, selecting a relaxation time and an offset voltage and fixing the values ahead of time may result in inaccurate SOC determinations. In the above-described system, this can lead to excessive charge cycling. For example, if the voltage value is overcompensated, the SOC may be set to a lower value. The SOC value may fall below a charge level that causes additional battery charging. In this situation, the BECM 206 may re-enter the charging phase and command charge current to the traction battery 124. This may be repeated a number of times. In some cases, the inaccuracy may lead to undercompensating the voltage value. This may lead to the SOC being displayed as different from a target SOC value provided by the operator. For example, additional measurements after longer relaxation periods can lead to lower values of SOC. Conditions may occur in which the operator expects the battery to be charged to a target SOC. A later measurement may be lower than the target SOC due to the voltage relaxation.

The target SOC function may result in a larger charging rate ($I_{rate}$) prior to charge completion. This can result in a case in which the voltage compensation should be greater than for charging to a full charge level (e.g., 100% SOC).

To improve the performance of the SOC estimation, an adaptive relaxation time, $T_{relax}$, and an adaptive compensation voltage, $V_{comp}$, may be generated. The adaptive relaxation time and the adaptive compensation voltage may be based on the cell temperature and the charging rate. The adaptive terms may be expressed as:

$$[T_{relax}, V_{comp}]=g(T, I_{rate}) \tag{2}$$

where g( ) is a function that may be implemented as formulas or a lookup table, T is the temperature, and $I_{rate}$ is the charge current. The adaptive terms may be computed upon completion of a charge cycle. A charge cycle may be completed upon achieving the target SOC or battery voltage exceeding a voltage threshold indicative of the target SOC. Responsive to the SOC becoming greater than the target SOC, the adaptive terms may be computed based on the temperature and charge current. The function g( ) may include a stored target relaxation time characteristic and a stored compensation voltage characteristic that are indexed by temperature and charge rate. The adaptive compensation voltage may be an expected voltage decay predicted to reach a fully relaxed state of the traction battery 124.

Based on data from FIG. 3 and FIG. 4, the BECM 206 may be programmed to increase a magnitude of the adaptive compensation voltage responsive to the temperature decreasing for a predetermined adaptive relaxation time. The BECM 206 may be programmed to increase a magnitude of the adaptive compensation voltage responsive to the charge rate increasing for a predetermined adaptive relaxation time.

In some configurations, the method can be further simplified by fixing the relaxation time. For example, the relaxation time may be fixed at 5 seconds. In some examples, the adaptive relaxation time may be set to a predetermined percentage of a predicted full relaxation time. In this configuration, only the compensation voltage is adaptively generated. The adaptive voltage term may be expressed as:

$$V_{comp} = g(T, I_{rate}) \quad (3)$$

The SOC may be derived as follows:

$$SOC = f(V_{t=5s} - g(T, I_{rate}), T) \quad (4)$$

As an example, the function $g(T, I_{rate})$ may be a lookup table. The function may also be constructed using data such as that shown in FIG. 3 and FIG. 4. The data for the function may be generated via testing by performing a charge cycle at various combinations of charge rates and temperatures. To reduce memory usage, the function may also include interpolating values between those stored in the tables. The function may also be constructed using one or more polynomials implemented in the software. For example, a curve fit algorithm may be performed on the curves to generate a formula or polynomial that best represents the curves. The function $f(\ )$ may represent a stored state of charge to voltage characteristic indexed by voltage and/or temperature. The BECM 206 may estimate the state of charge according to the stored state of charge to voltage characteristic that is indexed by the voltage.

Figure 5:
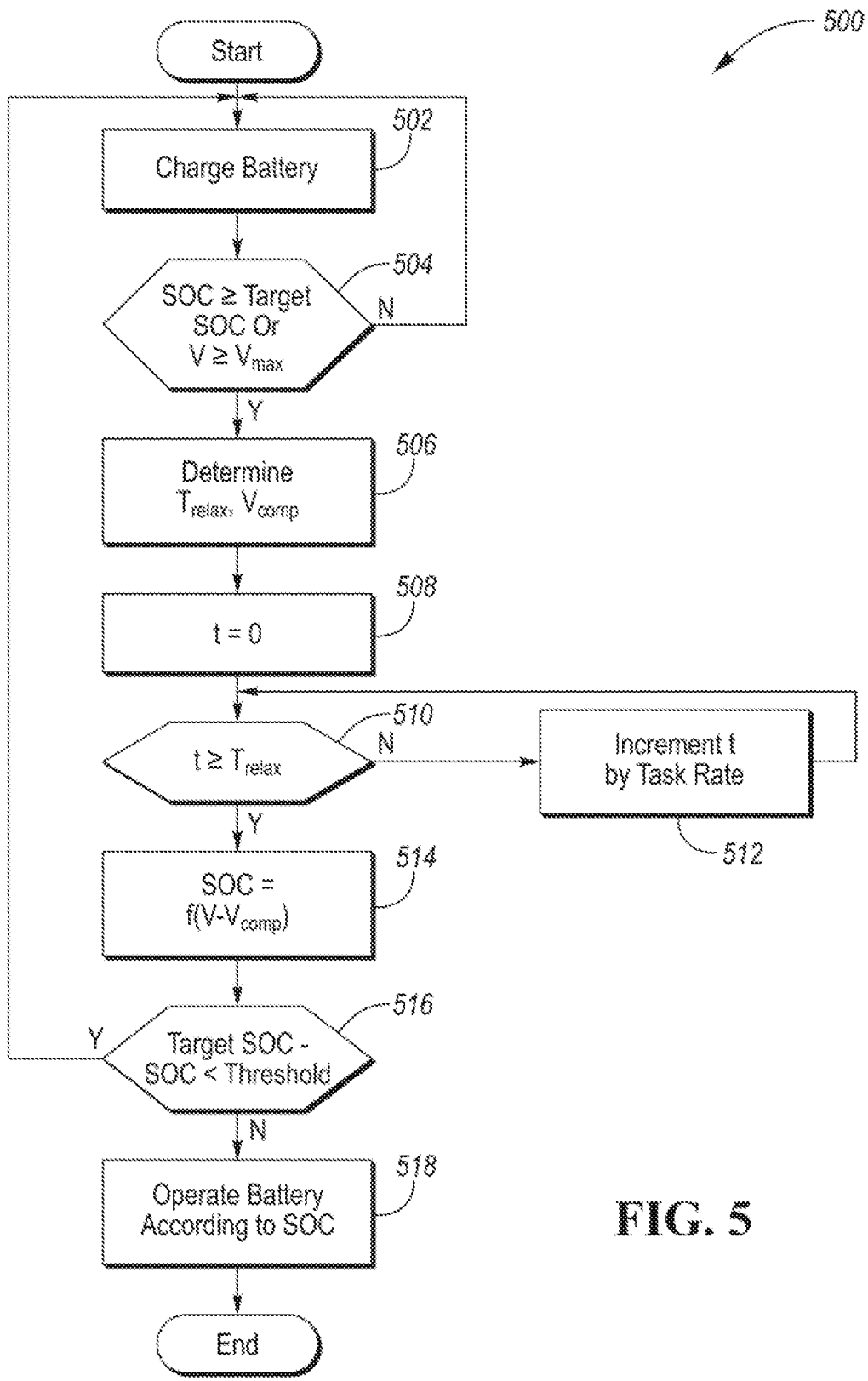
FIG. 5 is a flowchart for a possible sequence of operations for updating a state of charge of the traction battery.

FIG. 5 depicts an example of a possible flow chart 500 of a sequence of operations that may be implemented in one or more controllers (e.g., BECM 206). At operation 502, the traction battery 124 is charged. The BECM 206 may control the charge current during charging and estimate the SOC. For example, the SOC may be monitored using an amp-hour integration strategy during charging.

At operation 504, a check may be performed to determine if charging is completed. Charging may be completed when the SOC is greater than or equal to a target SOC. Charging may also be completed when the terminal voltage of the battery is greater than or equal to a maximum voltage threshold. When charging is completed, the charge current may be ramped to zero. If charging is not completed, operation 502 may be repeated. If charging is completed, operation 506 may be performed.

At operation 506, the adaptive relaxation time and the adaptive compensation voltage may be determined. For example, the strategies detailed above may be implemented to determine the adaptive terms based on temperature and charge rate. The controller may generate an adaptive relaxation time and an adaptive compensation voltage that change as a temperature and a charge rate of the traction battery change. The temperature may be measured and the value may be used to determine the adaptive terms. The charge rate may be monitored during charging and may be sampled just prior to charge termination. At operation 508, a timer is set to zero. The timer may be used to monitor the relaxation time.

At operation 510, a check may be performed to determine if the adaptive relaxation time has expired. The timer value may be compared to the adaptive relaxation time. If the timer value has not exceeded the adaptive relaxation time, operation 512 may be performed to increment the timer value. The timer value may be incremented by a task rate (e.g., 100 milliseconds). The task rate may correspond to the time period at which the charge monitoring task is repeated. If the timer value exceeds the adaptive relaxation time, operation 514 may be performed.

At operation 514, the SOC may be computed based on the terminal voltage and the adaptive compensation voltage. The terminal voltage may be measured at this time. The difference between the voltage and the adaptive compensation voltage may be used to index a table to find a corresponding SOC value. The controller may update a state of charge of the traction battery to a state of charge value corresponding to a voltage defined by a difference between a measured voltage of the traction battery and the adaptive compensation voltage responsive to expiration of the adaptive relaxation time after completion of the charge cycle. The state of charge may be updated to a different value than after previous charge cycles when the temperature and charge rate are different than the previous charge cycles.

At operation 516 a check may be performed to ensure that the SOC value is within predetermined limits. If the difference between the target SOC and the SOC is greater than or equal to a threshold, operations starting from operation 502 may be repeated. The system may initiate another charge cycle responsive to a difference between the state of charge value and a target state of charge exceeding a predetermined threshold. In this case, the SOC has not achieved the target SOC level. Charging may be reinitiated to ensure that the target SOC value is achieved. If the difference is less than the threshold, operation 518 may be performed.

At operation 518, the traction battery 124 may be operated according the SOC. Operating the traction battery 124 may include charging and/or discharging the traction battery 124. Operating the traction battery 124 may further include operating components that draw or provide power to the traction battery 124. For example, the system may operate the electric machines 114 and power electronics module 126 to cause charging and discharging of the traction battery 124 according to the SOC. As an example, the SOC may be operated within a predetermined operating range. Charging of the traction battery 124 may be initiated responsive to SOC falling below a lower limit and discharging of the traction battery 124 may be initiated responsive to SOC exceeding an upper limit. Operating the traction battery 124 may also include providing alerts to the operator based on the SOC value. For example, a low battery alert may be generated responsive to SOC falling below a threshold.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a traction battery; and
   a controller programmed to operate the traction battery according to a state of charge of the traction battery and, in response to completion of a charge cycle of the traction battery, generate an adaptive relaxation time and an adaptive compensation voltage that vary as a temperature and a charge rate of the traction battery change, and, in response to expiration of the adaptive relaxation time after completion of the charge cycle, update the state of charge to a value corresponding to a voltage defined by a difference between a measured voltage of the traction battery and the adaptive compensation voltage.

2. The vehicle of claim 1, wherein the controller is further programmed to increase a magnitude of the adaptive compensation voltage in response to decreasing the temperature for a predetermined adaptive relaxation time.

3. The vehicle of claim 1, wherein the controller is further programmed to increase a magnitude of the adaptive compensation voltage in response to increasing the charge rate for a predetermined adaptive relaxation time.

4. The vehicle of claim 1, wherein the controller is further programmed to estimate the state of charge of the traction battery according to a stored state of charge to a voltage characteristic that is indexed by the voltage.

5. The vehicle of claim 1, wherein the controller is further programmed to detect the completion of the charge cycle in response to a battery voltage of the traction battery exceeding a maximum voltage threshold.

6. The vehicle of claim 1, wherein the controller is further programmed to detect the completion of the charge cycle in response to an estimated state of charge of the traction battery during the charge cycle exceeding a user-defined target state of charge.

7. The vehicle of claim 1, wherein the controller is further programmed to generate the adaptive relaxation time according to a stored target relaxation time characteristic that is indexed by the temperature and the charge rate.

8. The vehicle of claim 1, wherein the controller is further programmed to generate the adaptive compensation voltage according to a stored target compensation voltage characteristic that is indexed by the temperature and the charge rate.

9. The vehicle of claim 1, wherein the controller is further programmed to sample the measured voltage upon expiration of the adaptive relaxation time.

10. The vehicle of claim 1, wherein the controller is further programmed to initiate another charge cycle in response to a difference between the state of charge and a target state of charge exceeding a predetermined threshold.

11. A method comprising:
    generating, by a controller, an adaptive relaxation time and an adaptive compensation voltage that vary as a temperature and a charge rate of a traction battery change in response to completion of a charge cycle of the traction battery;
    updating, by the controller, a state of charge of the traction battery to a state of charge value corresponding to a voltage defined by a difference between a measured voltage of the traction battery and the adaptive compensation voltage in response to expiration of the adaptive relaxation time after completion of the charge cycle of the traction battery; and
    operating, by the controller, the traction battery according to the state of charge of the traction battery.

12. The method of claim 11, wherein a magnitude of the adaptive compensation voltage increases as the charge rate increases for a predetermined adaptive relaxation time.

13. The method of claim 11, wherein a magnitude of the adaptive compensation voltage increases as the temperature decreases for a predetermined adaptive relaxation time.

14. The method of claim 11 wherein the adaptive relaxation time is set to a predetermined percentage of a predicted full relaxation time.

15. The method of claim 11 further comprising sampling, by the controller, the temperature and the charge rate upon completion of the charge cycle.

16. The method of claim 11 wherein the adaptive compensation voltage is an expected voltage decay predicted to reach a fully relaxed state of the traction battery.

17. A vehicle comprising:
    a traction battery; and
    a controller programmed to operate the traction battery according to a state of charge of the traction battery and, in response to completion of a charge cycle of the traction battery, generate an adaptive compensation voltage that is based on a temperature and a charge rate of the traction battery, and, in response to expiration of a predetermined relaxation time after completion of the charge cycle, update the state of charge to a value corresponding to a voltage defined by a difference between a measured voltage of the traction battery and the adaptive compensation voltage such that the state of charge is updated to a value different than that after previous charge cycles when the temperature and the charge rate are different than that of the previous charge cycles.

18. The vehicle of claim 17, wherein the controller is further programmed to increase a magnitude of the adaptive compensation voltage as the temperature decreases.

19. The vehicle of claim 17, wherein the controller is further programmed to increase a magnitude of the adaptive compensation voltage as the charge rate increases.

20. The vehicle of claim 17, wherein the adaptive compensation voltage is an expected voltage decay predicted to reach a fully relaxed state of the traction battery.

\* \* \* \* \*